United States Patent
Amos et al.

(10) Patent No.: US 10,787,963 B2
(45) Date of Patent: Sep. 29, 2020

(54) COMPRESSOR FLOW EXTRACTION APPARATUS AND METHODS FOR SUPERCRITICAL $CO_2$ OXY-COMBUSTION POWER GENERATION SYSTEM

(71) Applicant: University of Central Florida Research Foundation, Inc., Orlando, FL (US)

(72) Inventors: David Amos, Orlando, FL (US); Jayanta Kapat, Oviedo, FL (US); Narasimha Nagaiah, Orlando, FL (US); Akshay Khadse, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 232 days.

(21) Appl. No.: 15/104,940

(22) PCT Filed: May 16, 2016

(86) PCT No.: PCT/US2016/032766
§ 371 (c)(1),
(2) Date: Oct. 13, 2017

(87) PCT Pub. No.: WO2016/183588
PCT Pub. Date: Nov. 17, 2016

(65) Prior Publication Data
US 2018/0094580 A1  Apr. 5, 2018

Related U.S. Application Data

(60) Provisional application No. 62/161,433, filed on May 14, 2015.

(51) Int. Cl.
*F02C 3/34* (2006.01)
*F02C 9/18* (2006.01)
(Continued)

(52) U.S. Cl.
CPC .............. *F02C 3/34* (2013.01); *F01K 25/103* (2013.01); *F02C 1/05* (2013.01); *F02C 1/08* (2013.01);
(Continued)

(58) Field of Classification Search
CPC ...... F02C 3/34; F02C 3/08; F02C 3/09; F02C 1/08; F02C 9/18; F02C 3/04; F02C 3/103;
(Continued)

(56) References Cited

U.S. PATENT DOCUMENTS 2,303,381 A * 12/1942 New .................. F02C 3/34
60/774
2,943,839 A * 7/1960 Birmann ................ F01D 5/143
415/192

(Continued)

FOREIGN PATENT DOCUMENTS

WO      2014127913 A2     8/2014

*Primary Examiner* — Alain Chau
(74) *Attorney, Agent, or Firm* — Tiajoloff & Kelly LLP

(57) ABSTRACT

A power generation system burns a fuel in a gas in a combustion chamber, producing one or more combustion products and heating a working fluid, preferably supercritical $CO_2$, that is chemically the same as a combustion product. The working fluid is mixed with the combustion products to form a combustion output mixture which is used in a turbine to drive a shaft of the turbine connected with a generator, producing electricity. The turbine outputs an exhaust that goes to a working fluid recycling system that connects the turbine outlet with the combustion chamber. The fluid recycling system has a radial compressor that receives and pressurizes the exhaust mixture and sends it to a chamber that has a bleed outlet and a recycling outlet. The recycling outlet transmits a recycled portion of the exhaust mixture to the combustion chamber, and the bleed outlet carries an excess portion of the exhaust mixture that is not (Continued)

to be recycled to an extraction system that removes it from the power generation system for use in other applications.

29 Claims, 6 Drawing Sheets

(51) Int. Cl.
| | |
|---|---|
| *F04D 29/52* | (2006.01) |
| *F02C 3/04* | (2006.01) |
| *F02C 1/08* | (2006.01) |
| *F02C 3/08* | (2006.01) |
| *F02C 7/08* | (2006.01) |
| *F02C 1/05* | (2006.01) |
| *F01K 25/10* | (2006.01) |

(52) U.S. Cl.
CPC ............... *F02C 3/04* (2013.01); *F02C 3/08* (2013.01); *F02C 7/08* (2013.01); *F02C 9/18* (2013.01); *F04D 29/522* (2013.01); *F05D 2260/61* (2013.01); *Y02E 20/322* (2013.01)

(58) Field of Classification Search
CPC ...... F02C 6/08; F02C 1/05; F02C 7/08; F01K 25/103; F01K 23/06; F01K 23/10; F05D 2260/61; F05D 2260/611; F04D 29/522; Y02E 20/322
See application file for complete search history.

(56) References Cited

U.S. PATENT DOCUMENTS

| | | | | |
|---|---|---|---|---|
| 3,736,745 A * | 6/1973 | Karig | ................ | F01K 25/005 60/772 |
| 4,479,755 A | 10/1984 | Skoe | | |
| 4,498,289 A | 2/1985 | Osgerby | | |
| 4,528,811 A * | 7/1985 | Stahl | ................ | F01K 23/064 60/784 |
| 4,995,234 A * | 2/1991 | Kooy | ................ | F01K 25/10 60/648 |
| 5,094,069 A * | 3/1992 | Boffo | ................ | F23R 3/54 60/751 |
| 5,215,439 A * | 6/1993 | Jansen | ................ | F04D 29/284 415/914 |
| 5,235,803 A * | 8/1993 | Rodgers | ................ | F01D 17/162 415/155 |
| 5,724,805 A * | 3/1998 | Golomb | ................ | F01K 23/106 60/39.12 |
| 6,397,576 B1 * | 6/2002 | Rakhmailov | ........... | F01D 11/04 415/169.1 |
| 6,460,324 B1 * | 10/2002 | Rakhmailov | ........... | F01D 11/04 60/39.162 |
| 6,488,469 B1 | 12/2002 | Youssef et al. | | |
| 6,832,485 B2 * | 12/2004 | Sugarmen | ................ | C01B 3/34 60/39.12 |
| 8,231,341 B2 * | 7/2012 | Anderson | ................ | F02C 3/08 415/181 |
| 8,347,600 B2 * | 1/2013 | Wichmann | ................ | F02C 3/34 60/39.52 |
| 8,453,462 B2 * | 6/2013 | Wichmann | ................ | F02C 3/34 60/773 |
| 8,539,749 B1 * | 9/2013 | Wichmann | ................ | F02C 6/06 60/39.52 |
| 9,127,598 B2 * | 9/2015 | Snook | ................ | F01D 13/02 |
| 9,399,950 B2 * | 7/2016 | Mittricker | ................ | F01K 23/10 |
| 9,777,698 B2 * | 10/2017 | Schlak | ................ | F03B 13/00 |
| 2003/0097843 A1 * | 5/2003 | Sugarmen | ................ | F02C 3/28 60/780 |
| 2004/0005220 A1 * | 1/2004 | Kawamoto | ........... | F04D 29/284 416/223 R |
| 2009/0297335 A1 | 12/2009 | Karafillis et al. | | |
| 2010/0232953 A1 * | 9/2010 | Anderson | ................ | F02C 3/08 415/199.2 |
| 2011/0064583 A1 * | 3/2011 | Billotey | ................ | F01D 5/141 416/234 |
| 2012/0023954 A1 * | 2/2012 | Wichmann | ................ | F02C 3/34 60/772 |
| 2013/0118145 A1 * | 5/2013 | Palmer | ................ | F02C 1/06 60/39.52 |
| 2013/0125554 A1 * | 5/2013 | Mittricker | ................ | F01K 23/10 60/772 |
| 2015/0128597 A1 * | 5/2015 | Schlak | ................ | B64C 27/22 60/719 |

\* cited by examiner

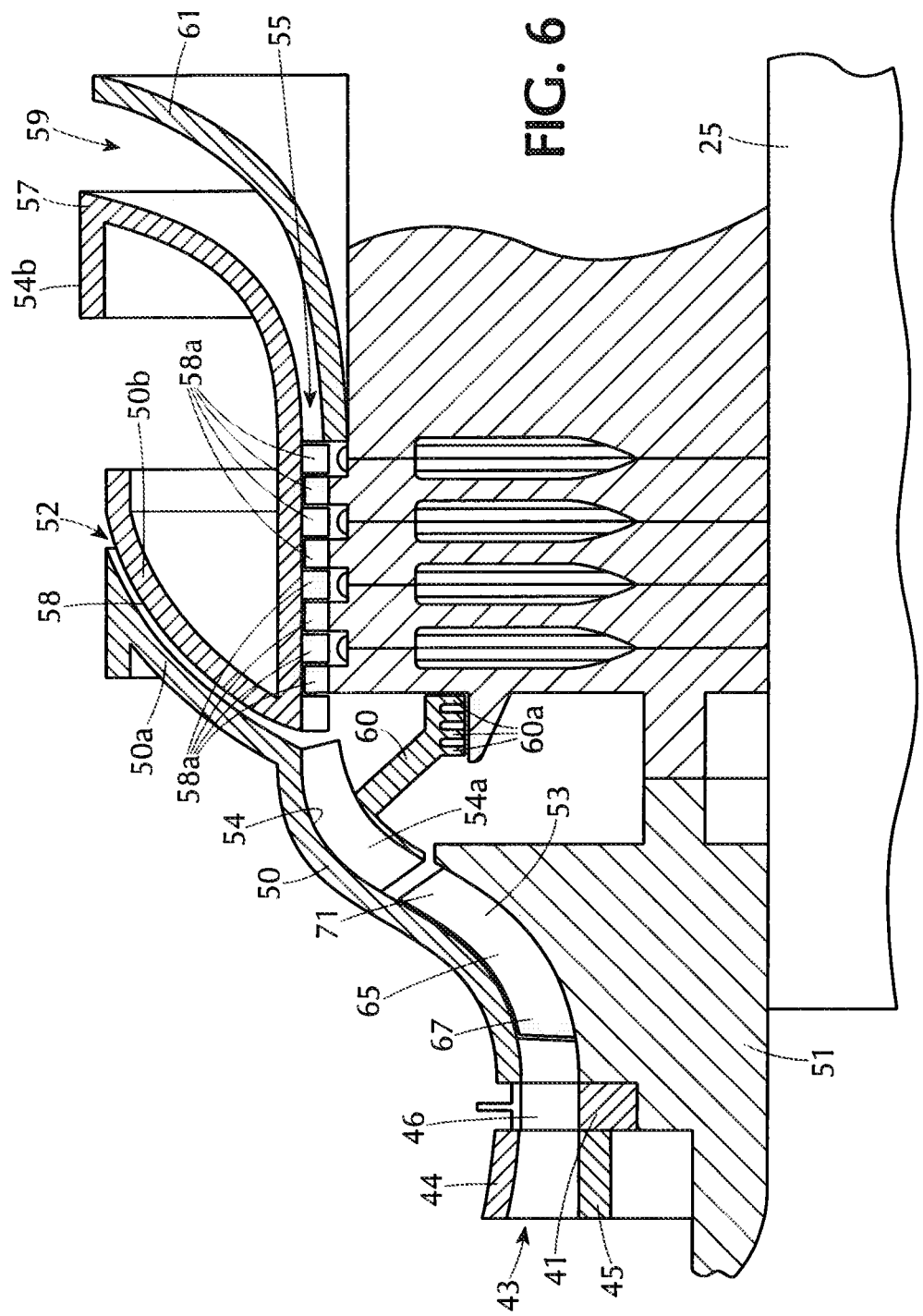

COMPRESSOR FLOW EXTRACTION
APPARATUS AND METHODS FOR
SUPERCRITICAL $CO_2$ OXY-COMBUSTION
POWER GENERATION SYSTEM

RELATED APPLICATIONS

This application claims the benefit of U.S. provisional patent application Ser. No. 62/161,433 filed May 14, 2015.

FIELD OF THE INVENTION

This invention relates to the general field of fossil fuel semi-closed Brayton cycle power generation systems, and more particularly to such systems that are turbines utilizing oxy-combustion in concert with supercritical carbon dioxide working fluid.

BACKGROUND OF THE INVENTION

One of the fundamental conundrums in today's power generation industry is the need to satisfy ever increasing global demand for energy while simultaneously reducing emissions of greenhouse gases widely considered deleterious to the world climate.

The vast majority of current power generation and energy production is accomplished by combustion of a fossil fuel, such as coal, gas, or oil, in an open thermodynamic cycle that exhausts various emissions to the atmosphere, primarily carbon dioxide, a major greenhouse gas. For well over a century, the efficiency of conventional open-cycle fossil fueled power generation systems, burning coal, gas and oil, have been gradually increased, and concomitantly, relative greenhouse gas emissions have been reduced proportionately.

Some newer solar-based technologies, featuring nil or very low emissions, are beginning their evolutionary development cycle, however their generally low efficiencies and high cost makes them only marginally attractive based on competitive economics.

Therefore there is a need for further reducing the greenhouse gas emissions of open-cycle fossil fueled power generation systems.

SUMMARY OF THE INVENTION

According to an aspect of the invention, a power generation system comprises a fuel source supplying a fuel, a gas source supplying a gas, and a combustion apparatus having inlets receiving the fuel and the gas. Combustion of the fuel with the gas takes place in the combustion apparatus and produces one or more combustion products. The combustion apparatus also receives a working fluid that is chemically the same as one or more of the combustion products, and it mixes the working fluid with the combustion products so as to produce a combustion output mixture that has been heated by the combustion of the fuel. A turbine receives the combustion output mixture and uses the combustion output mixture to rotate a shaft of the turbine. The turbine outputs at a turbine outlet a turbine output mixture derived from the combustion output mixture. A generator is operatively connected with the shaft to the turbine and driven by it. The generator converts rotary motion of the shaft into electrical energy and outputs the electrical energy. A working fluid recycling system connects the turbine outlet with the combustion apparatus. The fluid recycling system comprises a compressor receiving the turbine output mixture via one or more heat exchangers and increasing the pressure thereof so as to yield a pressurized mixture. The compressor transmits the pressurized mixture to a dividing structure having a bleed outlet and a recycling outlet. The recycling outlet connects with the combustion apparatus via the heat exchanger or exchangers and transmits a recycled portion of the pressurized mixture to it. The bleed outlet carries a second portion of the pressurized mixture that is not in the recycled portion to an extraction system that removes the second portion of the pressurized mixture from the power generation system.

According to another aspect of the invention, a turbine-based system employing a Brayton cycle employing supercritical $CO_2$ as a working fluid comprises a compressor assembly having structure defining an annular inlet space to which a $CO_2$ mixture is supplied from a heat exchanger that rejects heat to the environment. The compressor assembly further includes a first compressor driven by the turbine that receives the $CO_2$ mixture from the annular inlet space, applies an increased pressure to it, and transmits a resulting pressurized $CO_2$ mixture to a generally annular separation space. The generally annular separation space communicates with recycling structure having a recycling passage configured such that a recycled portion of the pressurized $CO_2$ mixture proceeds through it, and with a bleed structure having a bleed passage through which a bled portion of the $CO_2$ mixture proceeds to a $CO_2$ extraction system that removes the bled portion of the $CO_2$ mixture from the power generation system and cycle. A second compressor is driven by the turbine and receives $CO_2$ from a counter flow recuperative heat exchanger, applies an increased pressure to it and transmits the pressurized $CO_2$ mixture as a working fluid for the turbine via a series of recuperative heat exchangers and a combustor.

According to another aspect of the invention, a turbine-based system employing a Brayton cycle employing supercritical $CO_2$ as a working fluid comprises a compressor assembly having structure defining an annular inlet space to which a $CO_2$ mixture is supplied from the exhaust of a turbine. The compressor assembly further includes a first compressor driven by the turbine and receiving the $CO_2$ mixture from the annular inlet space, applying an increased pressure thereto, and transmitting a resulting pressurized $CO_2$ mixture to a generally annular separation space. The annular separation space communicates with recycling structure having a recycling passage configured such that a recycled portion of the pressurized $CO_2$ mixture proceeds through it, and with a bleed structure having a bleed passage through which a bled portion of the $CO_2$ mixture proceeds to a $CO_2$ extraction system that removes the bled portion of the $CO_2$ mixture from the turbine system. A second compressor is driven by the turbine and receives the recycled portion of the $CO_2$ mixture to which it applies an increased pressure and it transmits the pressurized second portion of the $CO_2$ mixture as supercritical $CO_2$ so as to be used as a working fluid for the turbine.

According to still another aspect of the invention, a method of producing energy comprises reacting fuel with a gas in a combustion chamber so as to form combustion products and heat. A working fluid that contains at least one chemical that is the same as one of the combustion products is heated with the heat and mixed with the combustion products so as to produce a heated mixture. The mixture is directed to a turbine where it expands to produce rotary motion of a shaft and delivers an exhaust mixture which is derived from the heated mixture. A generator is driven with rotational energy derived from the rotation of the turbine shaft. The turbine's exhaust mixture is compressed with a first compressor so as to yield a first pressurized mixture. The first pressurized mixture is separated into a bled fraction and a recycled fraction. The recycled fraction is directed to the combustion chamber so as to be recycled as the working fluid in the heating and mixing, and the bled fraction is removed from the system is stored for other applications.

It is also an object of the present invention to provide a fossil fuel semi-closed Brayton cycle which totally and economically captures traditional greenhouse gases.

It is a further object of the present invention to provide a power generation system using a fossil fuel semi-closed Brayton cycle that economically captures $CO_2$.

It is yet another object of the invention to provide a power generation system using a fossil fuel semi-closed cycle using supercritical $CO_2$ as a working fluid.

It is yet another object of the invention to provide a bleed system for a power generation system using a fossil fuel semi-closed cycle using supercritical $CO_2$ as a working fluid.

This invention reflects a paradigm shift in power generation in which the conventional fossil fuel open-cycle systems are replaced by a fossil fuel semi-closed cycle that totally and economically captures traditional greenhouse gases. The key is a semi-closed thermodynamic cycle in which heat addition for the thermodynamic cycle is accomplished by combusting a plentiful fuel such as natural gas ($CH_4$) in an oxygen environment ($O_2$) which results in the release of heat and the production of water ($H_2O$) and carbon dioxide ($CO_2$) in a semi-closed system enabling full capture and sequestration or economic recycling of these particular substances.

Other objects and advantages of the invention will become apparent from the specification herein.

BRIEF DESCRIPTION OF THE DRAWINGS

FIG. 6 is a partly cut away detail view of the compressor impeller and the compressor bleed portion according to the invention.

DETAILED DESCRIPTION

Figure 1:
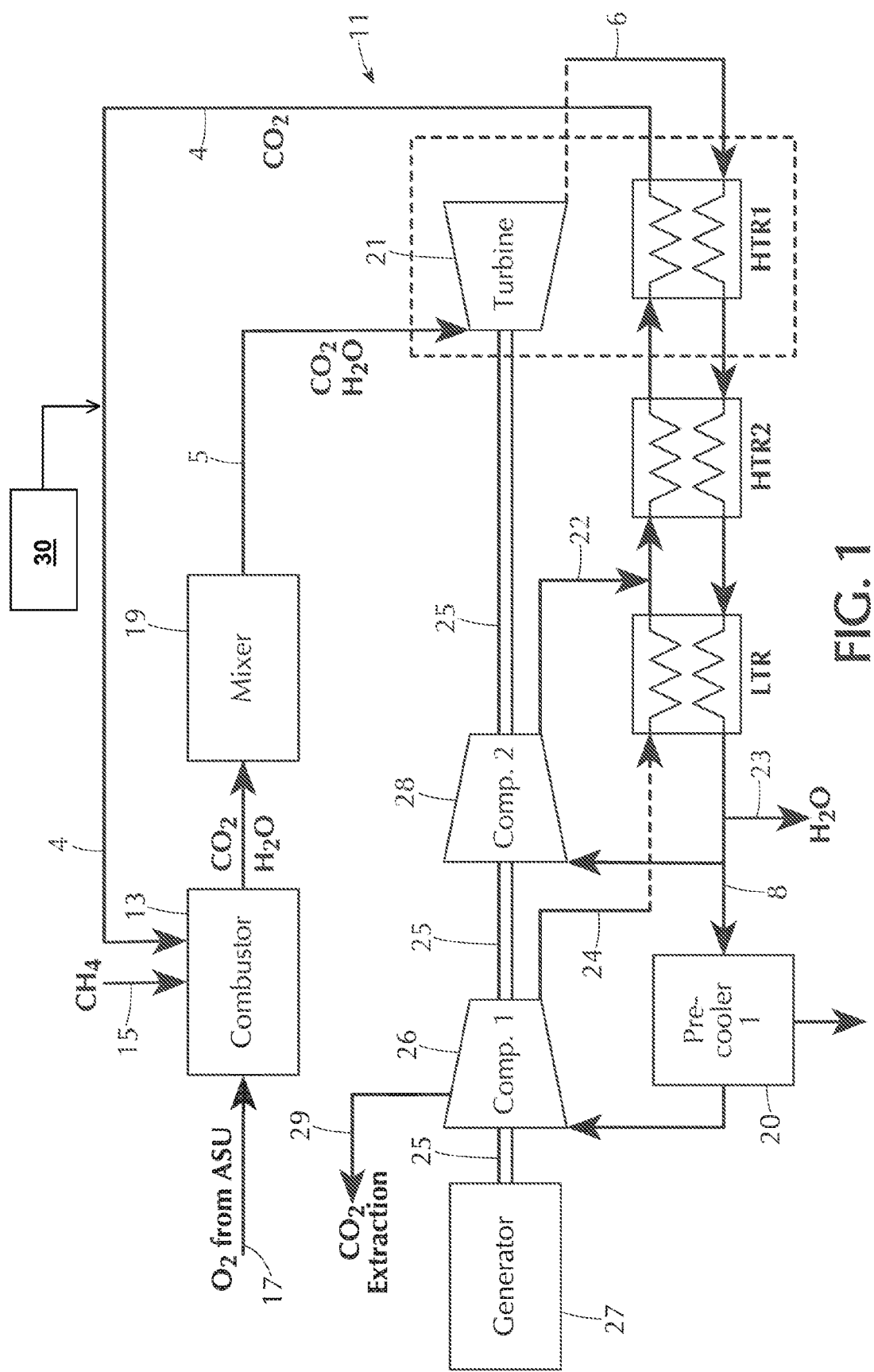
FIG. 1 is a schematic diagram of a semi-closed Recuperated Recompression Configuration (RRC) power generation system.

FIG. 1 shows a semi-closed cycle power generation system 11 that employs supercritical carbon dioxide as the working fluid, with a key element of heat addition of the working fluid prior to power extraction is accomplished in the combustor element 13 shown in FIG. 1. Alternative systems, such as a Recuperative Cycle (RC) system are also applicable to this invention.

The thermodynamic arrangement illustrated in FIG. 1 is generally referred to as a Brayton cycle, and it is characterized by compression, heating and expansion of the working fluid in a single phase, typically gaseous. This system is in contrast to a multiphase power generation cycle such as the Rankine cycle, which often employs steam as the working fluid in both liquid and gaseous phases.

Figure 2:
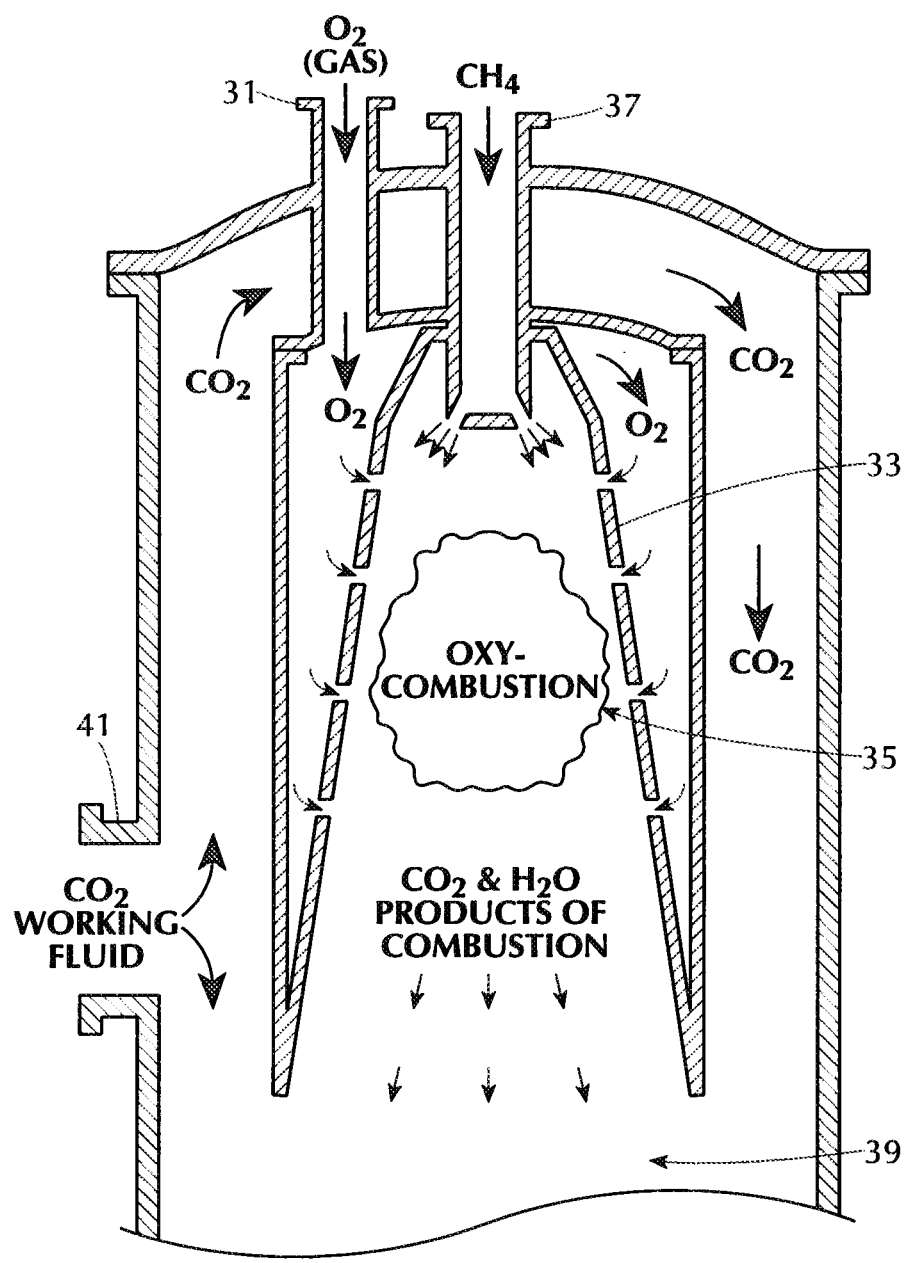
FIG. 2 is a schematic diagram showing an Oxy-Combustion $CH_4$—$O_2$ combustor and mixer.

In the heating portion of the subject Brayton cycle, represented in the Combustor 13 in FIG. 2, a fossil fuel, methane ($CH_4$) is supplied by a pipe or other similar connection 15 to the combustor 13 and combusted in an oxygen ($O_2$) environment, which is supplied by a connection 17 from an external Air Separation Unit (ASU) (not shown), which extracts substantially 100% $O_2$ from ambient air. The combustion of the $CH_4$ in the $O_2$ releases heat and forms water and carbon dioxide as combustion products. This process of combusting a fossil fuel in an oxygen environment is often referred to as an Oxy-Combustion process.

The main working fluid flow ($CO_2$) is supplied to the Combustor 13 and an associated Mixer 19 via pipe, connection or Cycle Point 4. The Mixer element 19 is usually structurally combined with the combustor 13, and in it, the $H_2O$ and $CO_2$ combustion products and the main working fluid ($CO_2$) are mixed so as to achieve a mixture at the desired turbine inlet temperature supplied by conduit or pipe 5 into the Turbine element 21 connected between conduit or cycle point 5 and conduit, communicating passage or Cycle Point 6. The passage of the mixture through the turbine causes the turbine to rotate shaft 25. Shaft 25 extends through compressor 1 (indicated at 26) and compressor 2 (indicated at 28), driving them, and also leading to and driving generator 27, which generates electrical power.

After passing through the turbine 21 causing rotation of shaft 25, the mixture then proceeds via connection 6 to a series of heat exchangers HTR1, HTR2, and LTR where appropriate recuperative heat energy is exchanged between hot side and cold side working fluids. The mixture loses heat as it passes from conduit 6 through the exchangers HTR1, HTR2 and LTR to conduit or passage 8.

Excess fluids $H_2O$, and $CO_2$ generated in the Oxy-Combustion process are extracted from the cycle at appropriate thermodynamic points. The removal of $CO_2$ prevents the development of excess $CO_2$ in the system and helps to maintain constant fluid mass in the system.

In conduit 8, the $H_2O$ combustion product from the oxy-combustion is removed from the mixture via outlet 23 by condensation or some other fluid separation method with proper attention paid to the efficient thermodynamic recovery of the sensible heat or heat of vaporization in the water capture and removal. This water is potentially very pure and may have significant commercial value as a by-product of the process.

The remaining fluid after $H_2O$ removal is essentially pure $CO_2$, which is present in a surplus because it comprises the $CO_2$ of the combustion products plus $CO_2$ of the working fluid that is cycling through the system. Passage 8 splits into two conduits or passages.

One of the passages carries some of the $CO_2$ to compressor 2 (28), which pumps the $CO_2$ back into the working fluid portion of the system via connection 22 so that it passes through heat exchangers HTR2 and HTR1, receiving heat therefrom and then, after being heated, entering the supercritical $CO_2$ conduit 4, which carries this $CO_2$ back to the combustor 13, to complete the cycle and be re-used further in the cycle.

The other passage carries part of the $CO_2$ to pre-cooler 20, which cools the $CO_2$ further and transmits it to compressor 1 (26), which optionally transmits a portion of the $CO_2$ through conduit or passage 24 to the cold side of LTR, where it is heated and flows through HTR2 and HTR1 to be heated further and be returned to supercritical $CO_2$ conduit 4, and back to the combustor 13 to be used in the system cycle. The rest of the $CO_2$ received at compressor 1 (26) is sent out via outlet 29 under pressure to be extracted as $CO_2$ to be stored or transmitted for use by another user for commercial applications such as chemical process use or enhanced oil recovery applications.

This semi-closed thermodynamic cycle is amenable to a solar augmentation hybrid arrangement (not shown). In such a system, a supplementary heat addition from another external source 30, such as a solar collector tower, is transferred to the working fluid flowing in conduit 4 between the heat exchanger HTR1 and the inlet to the combustor 13/mixer 19, thereby reducing the contribution of heat required from the combustor 13 from fossil fuel combustion. This is accomplished by, e.g., a heat exchanger or other heating transfer component in an intermediate part of conduit 4.

FIG. 2 illustrates the arrangement of the Oxy-Combustion process schematically. At the head end of the combustor, oxygen from an external source is introduced through inlet 31 around the combustor liner 33 so as to flow into the combustion flame zone 35 in a controlled manner through appropriate orifices in the liner for uniform mixing with the fossil fuel ($CH_4$ in this configuration, supplied via fuel nozzle inlet 37). In such a manner, the oxidizer, oxygen, supports complete combustion of the fossil fuel with release of heat and forms the combustion products water ($H_2O$) and carbon dioxide ($CO_2$) in accord with chemical reaction molar proportions.

Downstream of the combustion flame zone is a region 39 in which mixing takes place of the hot products of combustion with the main stream working fluid ($CO_2$) supplied through inlet 41 to act, according to thermodynamic heat-balance relationships, to raise the temperature of the overall mixed-out main working fluid flow and combustion products flows to the desired turbine inlet temperature at the inlet to the turbine element 21 (FIG. 1).

It should be noted that the introduction of the main stream working fluid ($CO_2$) supplied through inlet 41, which circulates around the main combustion liner assembly (33), serves to provide supplementary cooling of the complete liner assembly to help ensure satisfactory temperature and mechanical integrity of the liner assembly which is subjected to very high radiative and convective heat loading.

It should also be noted that, in systems with a combustion/mixer chamber as seen in FIG. 2, both water ($H_2O$) and excess carbon dioxide ($CO_2$) are extracted from the semi-closed cycle so as to maintain an essentially constant mass flow of working fluid, $CO_2$, through the turbomachinery elements.

Compressor Extraction Point Configuration

According to the invention, there is an extraction point 29 for the excess $CO_2$ working fluid produced by the Oxy-Combustion process. This extraction point 29 is from compressor 1, indicated at 26 in FIG. 1. The structure of an apparatus for use as that compressor is shown in FIG. 3

Figure 3:
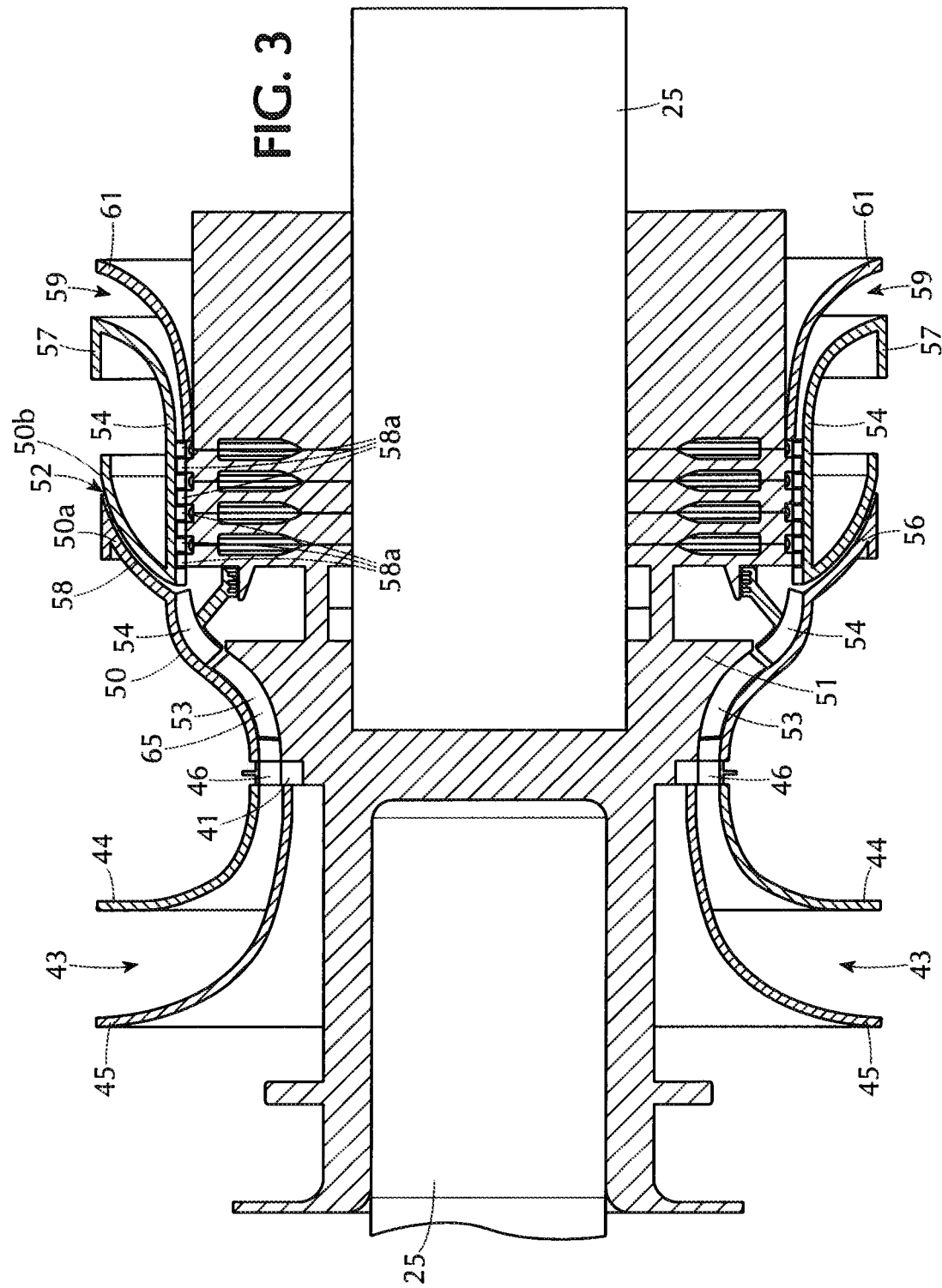
FIG. 3 is a cross sectional view of the compressor with bleed portion according to the invention.

Referring to FIG. 3, the compressor system 47 has an extraction bleed configuration. A $CO_2$ gas mixture flows from the pre-cooler 20 radially inward through a scroll connection structure (not shown) into duct 43, which is a tapering space defined between two shrouds 44 and 45, which are horn-shaped flaring surfaces of rotation about the axis of the turbine indicated at A-A. At this point, the working fluid, conducted through appropriate high pressure piping from the PreCooler 20, prior to which the $H_2O$ has been removed, is essentially 100% $CO_2$, and is at a pressure in a range of 750 to 3000 psi, or about 1100 psi, which is at the lowest pressure of the entire $CO_2$ cycle, as compared with the highest pressure levels of approximately 5000 psi at the exit of the compressors. The shrouds are supported in a substantially stationary position, while the internal structure of the compressor, including shaft 25, rotates with respect to them, supported relative to the shroud structure 44, 45 on rotary bearings (not shown), as is well known in the art, sealed with a conventional labyrinth seal 41, which allows for their relative rotational movement.

The intake duct 43 narrows radially/axially inward and forward of the intake shrouds 44 and 45 to meet a multiplicity of airfoil-shaped vanes (Inlet Guide Vanes or IGV's), 46, which serve to properly orient the flow direction upstream of the rotating impeller. The IGV's are supported on the non-rotating outer structure of the compressor, which includes the shrouds 44 and 45, and the IGV's do not rotate with the internal parts of the compressor about the longitudinal axis of the shaft 25. The IGV's may also be so supported as to be capable of rotating about their radial axes in unison, forming a uniform guide angle for the incoming $CO_2$ flow relative to a longitudinal direction of the compressor that is selected by the operator so as to achieve proper flow orientation relative to the impeller regardless of upstream thermodynamic condition variations.

Forward of the passage in IGV's 46, the passage communicates with an annular chamber defined radially inward of an outer housing 50 that is a surface of rotation that extends around the apparatus 47 and houses an impeller 53 fixedly mounted on body 51, which turns with the shaft 25 of the turbine 21, turning the impeller 53 with it as well. The turning of the impeller 53 draws in the mixture from the duct 43 and expels the fluid into diffuser 54 extending forward from the impeller 53 and also radially inward of housing 50. The diffuser 54 is circumferentially distributed parts of an annular space that is divided by mixed radially/longitudinally extending vanes 54*a* spaced circumferentially from each other so as to direct the flow of the $CO_2$ coming from the impeller 53. The vanes 54*a* are supported on the inward surface of outer wall 50, and are stationary relative to the moving vanes of impeller 53, as are the vanes 46. The vanes 46 have edge portions with edges that extend generally parallel to and axially spaced slightly from the edge portions of the intake ends or inducer 67 of impeller blades 65, and the vanes 54*a* have edge portions with edges at an angle relative to the radial direction roughly parallel to the angle of the edge of the outlet end 71 of the blades 65. This mixed-flow configuration (that is neither fully radial, nor fully axial) makes for effective compression of the $CO_2$ passing through the compressor.

In addition, the outer wall 50 is connected through or around the vanes 54*a* to a conical supporting structure 60 supporting a seal 60*a* that engages the rotating inner structure 51 of the compressor.

Diffuser 54 lead to an annular space that splits into a narrow, radially-outwardly disposed generally annular aperture 58 between a portion 50*a* of housing 50 and a portion 50*b* of an annular channel structure 54*b*, and a radially inwardly, forwardly-extending cylindrical space generally indicated at 55 around body 51. The aperture 58 may be interrupted in places for support structures between the wall portions 50*a* and 50*b* that maintain the shape of the aperture 58. The $CO_2$ passing through the diffuser 54 to aperture 58 is at a pressure in a range of 750 psi to 3000 psi.

The outwardly disposed aperture 58 (best seen in FIG. 6) extends around the body 51 and acts as a bleed extraction point or outlet 52 that extracts some of the $CO_2$ from the stream. The $CO_2$ is extracted from this extraction slot 52, and may be routed for storage and/or commercial sale, or the $CO_2$ can be reused proportionately, as appropriate, as makeup for working fluid lost due to seal leakage. The extraction bleed slot or outlet 52 may be a single slot in the circumference of channel member 54 between portions 50*a* and 50*b*, or it may be a series of circumferentially distributed slots defined between structures extending between portions 50*a* and 50*b*.

In addition to extracting gaseous phase $CO_2$ by this mechanism, it is important to note that by the nature of the thermodynamic conditions of the $CO_2$ working fluid at the inlet to the compressor, there may be, by the nature of the supercritical thermodynamics cycle, in an off-design or upset condition, some liquid phase $CO_2$ present in the working fluid mixture at this point in the cycle. The extraction system described herein provides an effective means for separation and removal of any liquid phase $CO_2$ working fluid which may be present to avoid liquid impact damage to some of the downstream compressor blading.

Figure 4:
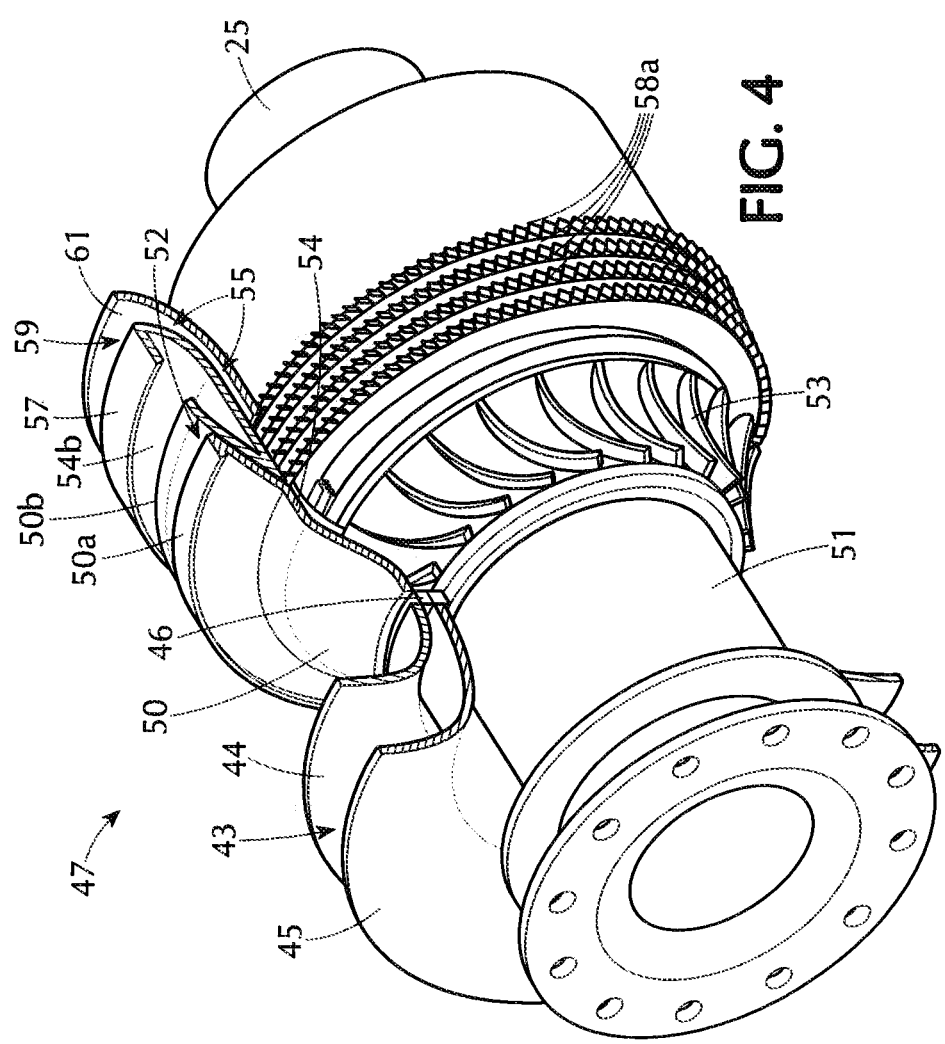
FIG. 4 is a partially cut-away isometric view of the compressor bleed portion according to the invention.
Figure 5:
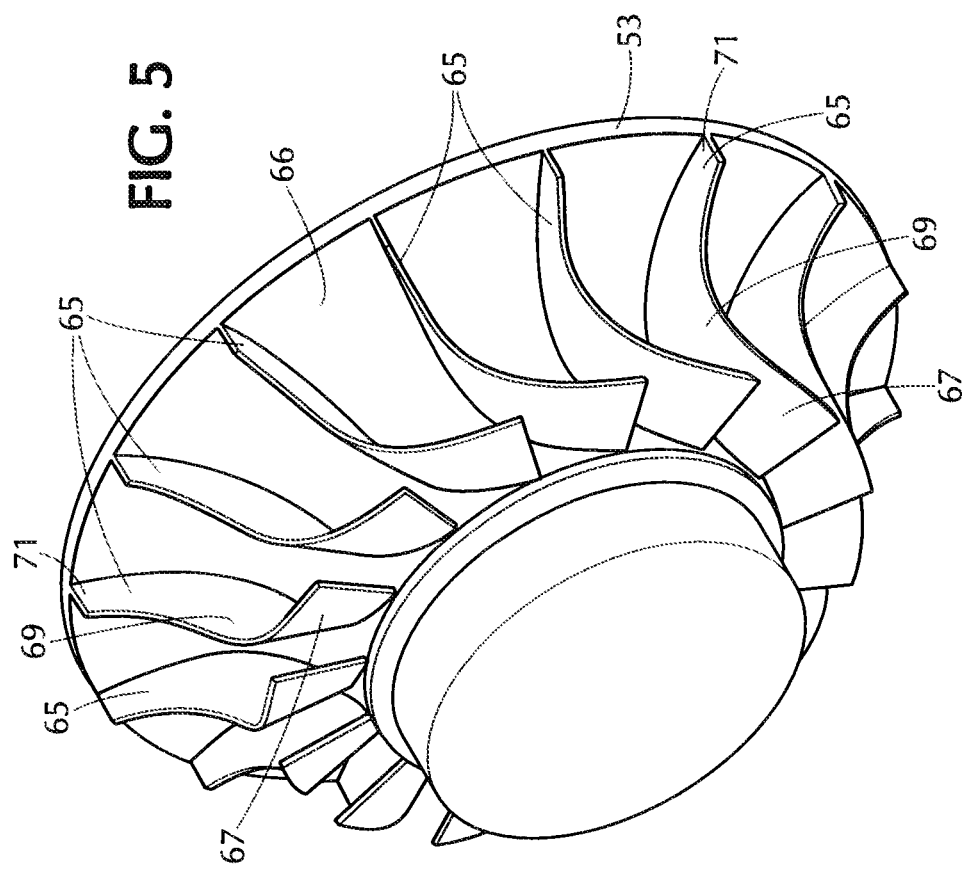
FIG. 5 is an isometric view of the compressor impeller according to the invention.

As shown in FIGS. 4, 5 and 6, the inward annular passage 55 includes a series of axial compressor stages 58*a*, which are co-acting blades on the rotor body 51 and vanes extended from the casing member 54*b* that draw the $CO_2$ fluid forward and pressurize it further. The pressurized $CO_2$ fluid passes outwardly through an annular vent 59 defined between the shroud portion 57 of member 54*b* and shroud 61, both of which are shapes of rotation about axis A-A. Structure (not shown) receives this $CO_2$ and transmits it through the heat exchangers LTR, HTR2 and HTR1, after which it is recycled into the supercritical $CO_2$ that is supplied to the combustor 13 and mixer 19 via connector or pipe 4. The pressure of the supercritical $CO_2$ in connector 4 is at least 1500 psi and preferably approximately 5,000 psi.

Referring to FIGS. 5 and 6, the compressor impeller 53 has blades 65 directing fluid flow extending outward from a generally concave conical surface 66. The impeller 53 is made from hard, durable material, preferably metal, capable of supporting the pressures and temperatures of the fluids involved. The blades 65 generally extend from the interior of the circular impeller to the circumference tapering to narrow over their lengths. The blades 65 are curved with each blade having a first portion 67 extending slopingly slightly forward and circumferentially toward incoming fluid flow. The blades 65 then curve to a middle portion 69 that extends slopingly more forward and radially outward, growing narrower and becoming forward end portions 71 that extend essentially radially straight outward from the rotational axis with a height conforming to that of the casing 50, through which the mixture is impelled by the impeller 53 that is narrower than the width of the blade 65 in the first portion 67.

The blades 65 are spaced equally around in a circular arrangement, wherein the blades are farther apart at the circumference of the impeller than in the interior. In the preferred embodiment there are nominally fifteen blades 65 on the impeller fan structure 53. Final selection of the number of impeller blades and particular configuration is a function of specific thermodynamic requirements.

In an alternative embodiment, the blades 65 may be angled at their end portions 71 so as to lie, not in a radial plane that in which the axis of the shaft 25 lies, but to have a circumferentially forward or backward leaning outflow. The choice of outflow angle is related to desired compressor fluid dynamic performance behavior and may be of differing orientation from the radial as determined by specific application.

The terms herein should be read as terms of description not limitation, as those of skill in the art with this disclosure before them will be able to make changes and modifications therein without departing from the spirit of the invention.

What is claimed is:

1. A power generation system comprising:
    a fuel source supplying a fuel;
    a gas source supplying a gas;
    a combustion apparatus having inlets receiving the fuel and the gas, wherein combustion of the fuel with the gas takes place in the combustion apparatus and produces one or more combustion products;
    said combustion apparatus also receiving a working fluid that is chemically the same as one or more of said combustion products, and mixing the working fluid with the combustion products so as to produce a combustion output mixture that has been heated by the combustion of the fuel;
    a turbine receiving the combustion output mixture and using said combustion output mixture to rotate a shaft of the turbine, said turbine outputting at a turbine outlet a turbine output mixture derived from the combustion output mixture;
    a generator operatively connected with the shaft and driven thereby, said generator converting rotation of the shaft into electrical energy and outputting the electrical energy;
    a working fluid recycling system connecting the turbine outlet with the combustion apparatus, said fluid recycling system comprising
    a compressor receiving the turbine output mixture via one or more heat exchangers and increasing the pressure thereof so as to yield a pressurized mixture;
    said compressor transmitting the pressurized mixture to a dividing structure having a bleed outlet and a recycling outlet;
    said recycling outlet connecting with the combustion apparatus via said one or more heat exchangers and transmitting thereto a recycled portion of the pressurized mixture; and
    the bleed outlet carrying a second portion of the pressurized mixture that is not in the recycled portion to an extraction system that removes the second portion of the pressurized mixture from the power generation system; and
    wherein the bleed outlet has a slot, a series of a plurality of intermittent slots or an annular space extending generally circumferentially of the compressor.

2. The power generation system of claim 1, wherein the fuel is a carbon-containing fuel.

3. The power generation system of claim 2, wherein the gas is an oxygen-containing gas.

4. The power generation system of claim 3, wherein the working fluid contains $CO_2$.

5. The power generation system of claim 4, wherein the extraction system stores the $CO_2$ extracted from the system under pressure in one or more containers or supplies $CO_2$ extracted to an external application.

6. The power generation system of claim 3, wherein the combustion output mixture is a mixture of water and $CO_2$.

7. The power generation system of claim 6, wherein the turbine extracts energy from the combustion output mixture to rotate the shaft, and the turbine output mixture is a mixture of water and $CO_2$ at a lower temperature or pressure than the combustion output mixture.

8. The power generation system of claim 6, wherein the water in the turbine output mixture is removed before transmission of the turbine output mixture to the compressor.

9. The power generation system of claim 1, wherein the combustion apparatus includes a structure that supplies the fuel and the gas to a combustion flame zone where the combustion takes place, and a liner surrounding the combustion flame zone, said working fluid being heated by contact with an outer surface of the liner and mixing with the combustion products as the combustion products leave the liner.

10. The power generation system of claim 1, wherein the one or more heat exchangers transfer heat from the turbine output mixture to the recycled portion of the pressurized mixture before transmission thereof to the combustion apparatus.

11. The power generation system of claim 1, wherein the compressor comprises a mixed-flow compressor stage having an impeller fixedly supported on the shaft so as to rotate therewith;
said impeller having a radially outwardly-sloping outwardly-disposed concave surface of rotation about a rotational axis about which the shaft rotates, and a plurality of blades extending outwardly from said concave surface;
said blades having an outer edge extending adjacent and spaced from an inside surface of a stationary housing surrounding the impeller.

12. The power generation system of claim 11, wherein said blades each have an intake end angled forward in a direction of rotation of the impeller and an outward end that is perpendicular to the direction of rotation.

13. The power generation system of claim 11, wherein said blades each have an intake end angled forward in a direction of rotation of the impeller and an outward end that is angled rearward relative to the direction of rotation of the impeller.

14. The power generation system of claim 1, and
said compressor further comprising axial compressor stages receiving the recycled portion of the pressurized mixture and comprising a set of blades extending outwardly from a rotating portion of the compressor and a set of vanes extending inward from a stationary outer structure that are cooperative with the set of blades so as to increase pressure of said recycled portion of the pressurized mixture.

15. The power generation system of claim 1, wherein a counter-flow recuperative heat exchanger receives said recycled portion of the pressurized mixture and a second compressor imparts thereto an increase in pressure.

16. The power generation system of claim 1, wherein the fuel is a hydrocarbon fuel.

17. The power generation system of claim 16, wherein the gas is 100% $O_2$.

18. The power generation system of claim 1, wherein the fuel is $CH_4$.

19. The power generation system of claim 1, wherein the gas is an oxygen-containing gas.

20. The power generation system of claim 1, wherein the working fluid is 100% $CO_2$.

21. The power generation system of claim 1, wherein the working fluid is supercritical $CO_2$.

22. A turbine-based system employing a Brayton cycle employing supercritical $CO_2$ as a working fluid, said system comprising:
a compressor assembly having a structure defining an annular inlet space to which a first portion of a $CO_2$ mixture is supplied from a heat exchanger that cools said first portion of the $CO_2$ mixture, said compressor assembly further including
a first compressor driven by a turbine and receiving said first portion of the $CO_2$ mixture from the annular inlet space, applying an increased pressure thereto, and transmitting a resulting pressurized $CO_2$ mixture to a generally annular separation space communicating with a recycling structure having a recycling passage configured such that a recycled portion of the pressurized $CO_2$ mixture proceeds therethrough, and with a bleed structure having a bleed passage through which a bled portion of the pressurized $CO_2$ mixture proceeds to a $CO_2$ extraction system that removes the bled portion of the pressurized $CO_2$ mixture from the turbine-based system and Brayton cycle;
a second compressor driven by the turbine and receiving a second portion of the $CO_2$ mixture from a counter flow recuperative heat exchanger and applying an increased pressure thereto and transmitting the second portion of the $CO_2$ portion with the recycled portion of the pressurized $CO_2$ mixture as the working fluid for the turbine via a series of recuperative heat exchangers and a combustor;
the turbine driving a shaft having an axis of rotation; and
the bleed structure being a first housing portion supported stationary relative to the shaft, and defining the bleed passage as a continuous or intermittent annular-portion slot or series of slots therein extending circumferentially partially or completely around the first housing portion;
said continuous or intermittent annular-portion slot or series of slots having a length and width selected such that the bled portion of the $CO_2$ mixture in the annular separation space enters said bleed passage by proceeding generally radially outward of the annular separation space, and the recycled portion of the $CO_2$ mixture proceeds past the bleed passage inward thereof and forward to the second compressor, and such that the recycled and bled portions of the $CO_2$ mixture are in amounts such that development of an excess amount of $CO_2$ in the system is prevented by removal of the bled portion from the turbine system.

23. The turbine-based system of claim 22, and
the first compressor having a first stage and subsequent stages;
the first stage of the first compressor being a mixed-flow stage having an impeller fixedly connected with the shaft, said impeller having a concave conical outward surface extending concavely forward and outward from the annular inlet space and toward the annular separation space, and a plurality of blades supported on and extending radially away from said concave conical surface, said blades having intake ends angled so as slope in the direction of rotation of the impeller;
the impeller being followed by a diffuser fixedly connected to the stationary outer casing, said diffuser having multitude of flow paths created by vanes of equal circumferential spacing;
the subsequent stages of the first compressor being axial compressor stages including a number of angled blades supported in one or more circumferential sets on a body portion rotating with the shaft and extending outwardly therefrom, the recycling passage being a generally cylindrical space defined between the body portion and a second housing portion supported stationary relative to the shaft, and the pressurized recycled portion of the $CO_2$ mixture being delivered to an annular output space defined in said second housing portion;

the first and second stationary housing portions each supporting thereon respective groups of vanes extending radially inward and lengthwise axially of the shaft so as to cooperate with the plurality of blades of the impeller and the axial compressor, respectively;

the $CO_2$ mixture in the annular inlet space having a pressure of 750 to 3,000 psi, and the $CO_2$ mixture in the annular output space having a pressure of at least 1,500 psi.

24. The turbine-based system of claim 23, wherein the pressure of the $CO_2$ mixture in the annular inlet space is about 1,100 psi, and the pressure of the $CO_2$ mixture in the annular output space is at least 5,000 psi.

25. A method of producing energy, said method comprising:

reacting fuel with a gas in a combustion chamber so as to form combustion products and heat;

heating a working fluid that contains at least one chemical that is the same as one of the combustion products with the heat and mixing the working fluid with the combustion products so as to produce a heated mixture;

conducting the heated mixture to a turbine that uses the heated mixture to produce rotation of a shaft and produces an exhaust mixture derived from the heated mixture;

driving a generator with rotational energy derived from said rotation of the shaft;

compressing the exhaust mixture with a first compressor so as to yield a first pressurized mixture;

separating the first pressurized mixture into a bled fraction and a recycled fraction;

conducting the recycled fraction to the combustion chamber so as to be recycled as the working fluid in said heating and mixing; and removing the bled fraction from the system; and wherein the first compressor has a first stage that is a mixed-flow stage comprising a rotating impeller that is supported on the shaft so as to be rotated thereby, and the separating being accomplished by causing the first pressurized mixture to flow to a chamber having a circumferentially extending slot that forms a radially outward extending bleed passage through which the bled portion passes.

26. A method according to claim 25, wherein the fuel is a hydrocarbon fuel, and the working fluid is supercritical $CO_2$;

wherein the method further comprises:

extracting water from the exhaust mixture before compressing the exhaust gas;

transferring heat from the exhaust mixture to the recycled fraction with one or more heat exchangers before said recycled fraction is conducted to the combustion chamber and before the exhaust mixture is compressed by the first compressor;

pressurizing the recycled fraction to a pressure of at least 1500 psi before the recycled fraction is directed to the combustion chamber;

the pressurizing of the recycled fraction comprising pressurization thereof with a number of axial compressor stages that are rotated with the shaft from the turbine, and that are parts of the said first compressor.

27. The method of claim 26, wherein the recycled fraction is pressurized to a pressure of at least 5,000 psi before the recycled fraction is directed to the combustion chamber.

28. The method of claim 25, wherein the working fluid is heated before being heated by the combustion using an external heat source.

29. The method of claim 28, wherein the working fluid external heat source is a solar heater.

* * * * *